United States Patent
Wakuda (10) Patent No.: US 10,916,108 B2
(45) Date of Patent: Feb. 9, 2021

(54) ROTATION-TYPE MANIPULATION DEVICE, CONTROL METHOD FOR THE SAME, AND PROGRAM

(71) Applicant: Alps Alpine Co., Ltd., Tokyo (JP)

(72) Inventor: Hiroshi Wakuda, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/653,513

(22) Filed: Oct. 15, 2019

(65) Prior Publication Data

US 2020/0043305 A1 Feb. 6, 2020

Related U.S. Application Data

(63) Continuation of application No. PCT/JP2018/015508, filed on Apr. 13, 2018.

(30) Foreign Application Priority Data

Apr. 21, 2017 (JP) ................. 2017-084370

(51) Int. Cl.
| | |
|---|---|
| *G08B 6/00* | (2006.01) |
| *F16D 57/00* | (2006.01) |
| *G05G 1/08* | (2006.01) |
| *G05G 5/03* | (2008.04) |
| *H02P 6/08* | (2016.01) |
| *H02P 6/24* | (2006.01) |

(52) U.S. Cl.
CPC ............ *G08B 6/00* (2013.01); *F16D 57/002* (2013.01); *G05G 1/08* (2013.01); *G05G 5/03* (2013.01); *H02P 6/08* (2013.01); *H02P 6/24* (2013.01); *G05G 2505/00* (2013.01)

(58) Field of Classification Search
CPC .......... G08B 6/00; F16D 57/002; G05G 1/08; G05G 5/03; G05G 2505/00; H02P 6/08; H02P 6/24
USPC ...................................... 340/407.2
See application file for complete search history.

(56) References Cited

U.S. PATENT DOCUMENTS

| | | | | |
|---|---|---|---|---|
| 2004/0056624 A1* | 3/2004 | Hyasaka et al. | .......... | G06F 3/00 318/560 |
| 2018/0354757 A1* | 12/2018 | Jantunen | ................. | G08B 6/00 |

FOREIGN PATENT DOCUMENTS

JP     2004-114201 A     4/2004

* cited by examiner

*Primary Examiner* — Omar Casillashernandez
(74) *Attorney, Agent, or Firm* — Brinks Gilson & Lione (57) ABSTRACT

Braking torque based on a friction force is increased in a pulse state in a transition area in which control torque changes from a direction to encourage the rotation of a manipulation member to a direction to suppress the rotation. This braking torque based on a friction force does not cause vibration unlike the driving torque of an electric motor even if the braking torque is steeply increased. Therefore, when the rotational angle passes through the transition area, a clearer click feeling can be generated without a change like vibration being caused in control torque. When the manipulation member is rotated fast, the braking torque in a pulse state is likely to be felt as vibration.

10 Claims, 8 Drawing Sheets

ROTATION-TYPE MANIPULATION DEVICE, CONTROL METHOD FOR THE SAME, AND PROGRAM

CLAIM OF PRIORITY

This application is a Continuation of International Application No. PCT/JP2018/015508 filed on Apr. 13, 2018, which claims benefit of priority to Japanese Patent Application No. 2017-084370 filed on Apr. 21, 2017. The entire contents of each application noted above are hereby incorporated by reference.

BACKGROUND

1. Field of the Disclosure

The present disclosure relates to a rotation-type manipulation device that can control a manipulation feeling accompanying a rotation manipulation and to a control method for the rotation-type manipulation device and a program.

2. Description of the Related Art

A known rotation-type manipulation device accepts an input for the switching of the transmission of a vehicle, volume adjustment for an audio device, or the like through the rotation of a manipulation member. A force sense imparting input device described in Japanese Unexamined Patent Application Publication No. 2004-114201, for example, has a manipulation member on which a rotation manipulation is performed by the manipulator, an electric actuator that gives torque to the manipulation member, a rotational angle detecting means for detecting the rotational angle of the manipulation member, a rotational speed detecting means for detecting the angular speed of the manipulation member, and a control means for controlling the electric actuator according to the rotational angle and angular speed of the manipulation member. This force sense imparting input device can produce a manipulation feeling similar to that from a clicking mechanism by controlling torque given from the electric actuator to the manipulation member according to the rotational angle and angular speed, involved in the rotation manipulation, of the manipulation member.

The electric actuator described in Japanese Unexamined Patent Application Publication No. 2004-114201 above, which is, for example, an electric motor, can reverse the direction of torque to be given to the manipulation member. Therefore, the device in described in Japanese Unexamined Patent Application Publication No. 2004-114201 controls the electric actuator (motor) so that the magnitude of torque to be given to the manipulation member is changed and the direction of torques is reversed.

To produce a clear click feeling, it is desirable to change torque to be given to the manipulation member as steep as possible. However, an electric actuator such as a motor has a structure that enables torque to be generated in both directions. Therefore, if torque is changed so steep, a change in torque like vibration is likely to occur. If torque changes like vibration, it becomes difficult to obtain a clear click feeling. This is problematic in that the quality of a manipulation feeling is lowered.

SUMMARY

A rotation-type manipulation device according to a first aspect of the present invention has: a manipulation member that can be rotated according to a rotation manipulation; a rotational angle sensor that detects the rotational angle of the manipulation member; a driving machine that drives the rotation of the manipulation member; a braking machine that applies a brake to the rotation of the manipulation member by using a friction force; and a control unit that controls control torque, which is the sum of the driving torque of the driving machine and the braking torque of the braking machine, according to the rotational angle detected in the rotational angle sensor. The control unit changes the direction of the control torque from an encouragement direction to encourage the rotation of the manipulation member to a suppression direction to suppress the rotation as the rotational angle changes in one direction. When the rotational angle passes through a transition area in which the control torque changes from the encouragement direction to the suppression direction, the control unit increases the braking torque in a pulse state.

With this rotational-type manipulation device, when the control torque in the encouragement direction is reduced as the rotational angle changes, a sense that the drawing force is weakened as the manipulation member rotates is obtained. Also, when the control torque in the suppression direction is increased as the rotational angle changes, a sense that a resistive force is increased as the manipulation member rotates is obtained. Since this change in the control torque occurs, it becomes easy to stably stop the rotation of the manipulation member in an area in which the control torque changes from the encouragement direction to the suppression direction. Also, a click feeling accompanying a rotation manipulation is produced due to a change of the control torque.

Furthermore, with this rotational-type manipulation device, when the rotational angle passes through the transition area in which the control torque changes from the encouragement direction to the suppression direction, the braking torque based on a friction force is increased in a pulse state. Therefore, when the rotational angle passes through the transition area, a clearer click feeling is produced without a change like vibration being caused in the control torque. In addition, since the stopping of the rotation in the transition area is assisted by the braking torque increased in a pulse state, it becomes easy to stop the rotation in the transition area and the manipulation feeling becomes more superior.

A second aspect of the present invention relates to a control method for a rotation-type manipulation device that controls control torque to be applied to a manipulation member that can be rotated according to a rotation manipulation. The rotation-type manipulation device has a rotational angle sensor that detects the rotational angle of the manipulation member, a driving machine that drives the rotation of the manipulation member, and a braking machine that applies a brake to the rotation of the manipulation member. The control torque is the sum of driving torque of the driving machine and braking torque of the braking machine. The control method for the rotation-type manipulation device has changing the control torque from an encouragement direction to encourage the rotation of the manipulation member to a suppression direction to suppress the rotation as the rotational angle changes in one direction, and increasing, when the rotational angle passes through a transition area in which the control torque changes from the encouragement direction to the suppression direction, the braking torque in a pulse state.

A third aspect of the present invention relates to a non-volatile memory that contains a program that causes a computer to execute the control method for a rotation-type manipulation device according to the above second aspect.

DESCRIPTION OF THE EXEMPLARY EMBODIMENTS

Figure 1:
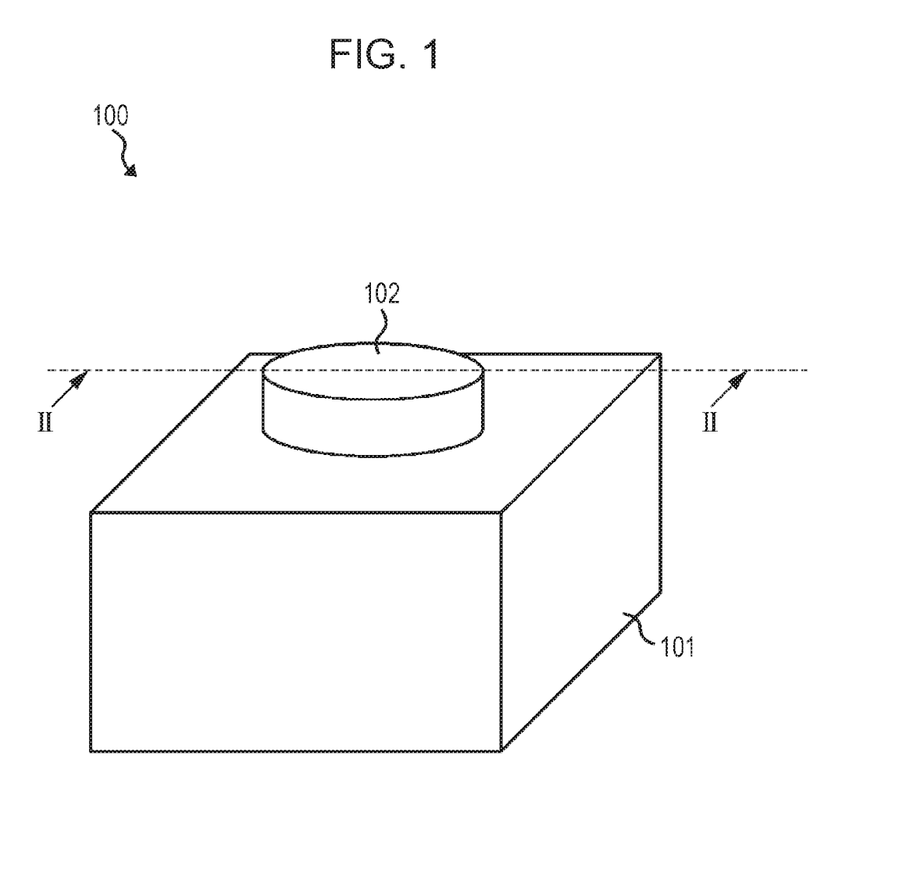
FIG. 1 is a perspective view illustrating an example of the appearance of a rotation-type manipulation device according to an embodiment of the present invention.
Figure 2:
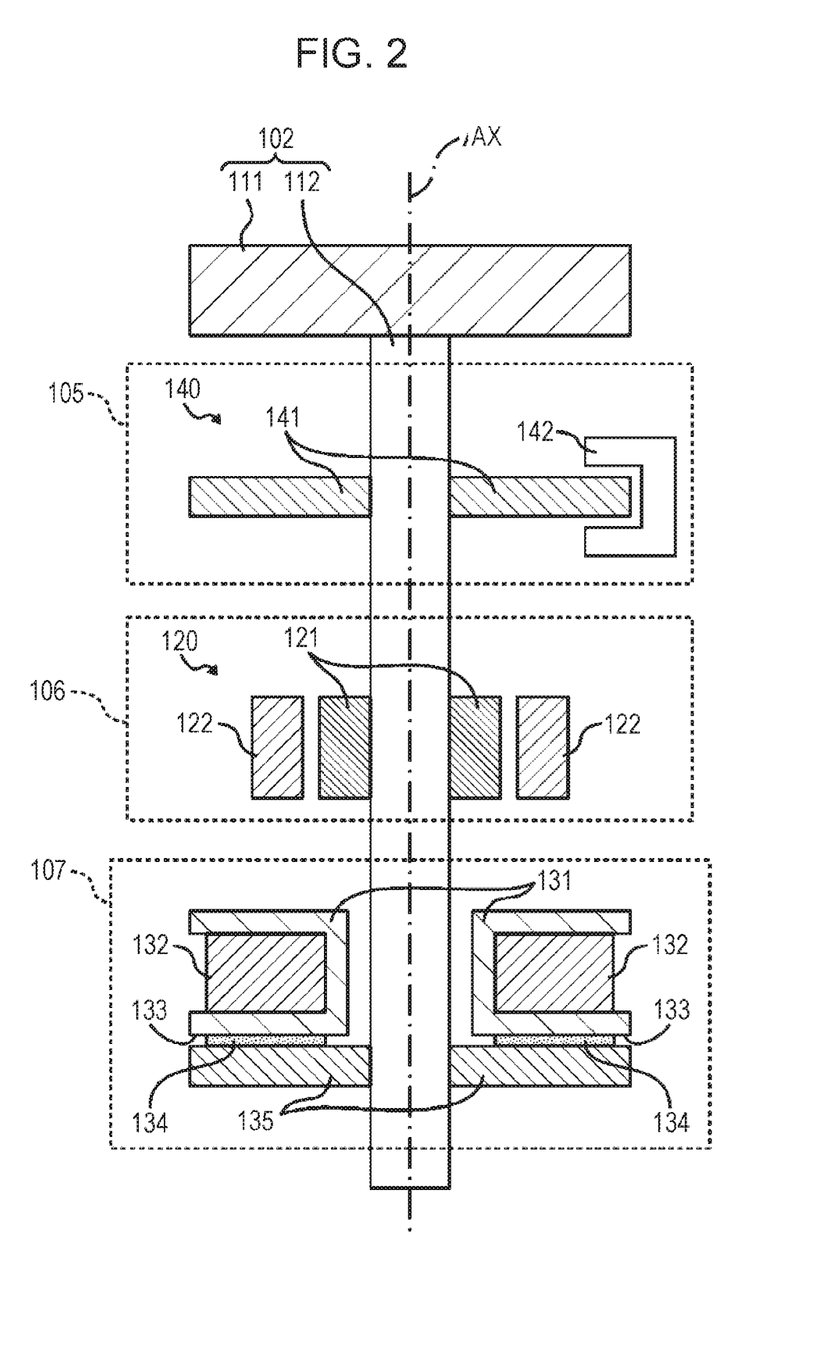
FIG. 2 is a partial cross-sectional view of the rotation-type manipulation device as taken along line II-II in FIG. 1.
Figure 3:
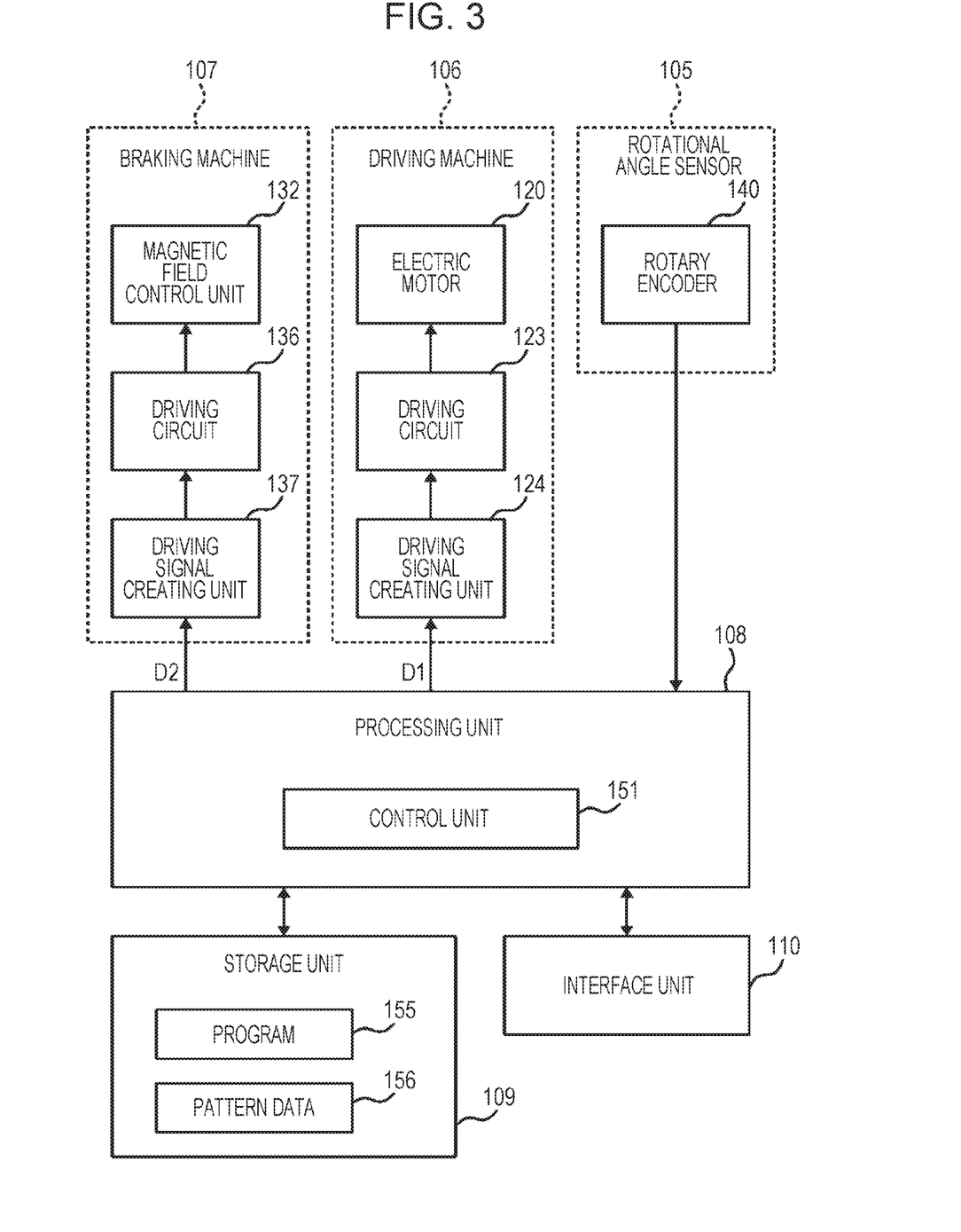
FIG. 3 is a block diagram illustrating an example of the structure of the rotation-type manipulation device illustrated in FIG. 1.

A rotation-type manipulation device according to an embodiment of the present invention will be described below with reference to the drawings. FIG. 1 is a perspective view illustrating an example of the appearance of the rotation-type manipulation device 100 according to this embodiment. FIG. 2 is a partial cross-sectional view of the rotation-type manipulation device 100 as taken along line II-II in FIG. 1. FIG. 3 is a block diagram illustrating an example of the structure of the rotation-type manipulation device 100 illustrated in FIG. 1.

As illustrated in FIG. 1, the rotation-type manipulation device 100 has a manipulation member 102 that can be rotated through a rotation manipulation by the manipulator, and also has a case 101 that rotatably supports the manipulation member 102. The rotation-type manipulation device 100 creates manipulation information related to rotation manipulations such as, for example, the rotational angle, rotational position, and rotational speed of the manipulation member 102. The rotation-type manipulation device 100 is used to, for example, adjust the volume of an audio device or switch the transmission of a vehicle.

The cut surface in FIG. 2 passes along the rotational axis AX of the manipulation member 102. As illustrated in FIG. 2, the manipulation member 102 includes a shaft 112 that is rotatably supported by the case 101, and also includes a knob 111 fastened to the shaft 112. The shaft 112 is accommodated in the case 101. The knob 111, which is exposed to the outside of the case 101, receives a rotation manipulation by the manipulator. In the examples in FIGS. 1 and 2, the knob 111 and shaft 112 have a columnar shape the central axis of which is the rotational axis AX and thereby integrally rotate around the rotational axis AX.

As illustrated in FIG. 2, the rotation-type manipulation device 100 has a rotational angle sensor 105, a driving machine 106, and a braking machine 107 as the structure of a mechanical system. The rotational angle sensor 105, driving machine 106, and braking machine 107 are accommodated in the case 101 so as to be disposed along the shaft 112 of the manipulation member 102.

As illustrated in FIG. 3, the rotation-type manipulation device 100 further includes a processing unit 108, a storage unit 109, and an interface unit 110 as the structure of a control system.

Driving Machine

The driving machine 106 drives the rotation of the manipulation member 102 under control by the processing unit 108. Specifically, the driving machine 106 generates driving torque Td that drives the rotation of the manipulation member 102 in response to a first control signal D1 received from the processing unit 108. The driving machine 106 includes an electric motor 120 such as a direct current (DC) motor as indicated in, for example, FIG. 2. In the example in FIG. 2, the electric motor 120 includes a plurality of rotors 121 that rotate together with the shaft 112, and also includes a plurality of stators 122 disposed opposite to the rotors 121. The rotor 121 is, for example, a permanent magnet, and the stator 122 is, for example, a coil. When a driving current with a predetermined waveform is supplied to each coil of the plurality of stators 122, a magnetic field exerted on the plurality of rotors 121 is generated and driving torque Td that drives the rotation of the plurality of rotors 121 together with the shaft 112 is generated. The magnitude of driving torque Td changes according to the magnitude of the driving current to be supplied to the coil of the stator 122.

The driving machine 106 further includes a driving circuit 123 and a driving signal creating unit 124 as illustrated in FIG. 3. The driving circuit 123 generates a driving current responsive to a received driving signal, and supplies the driving current to each of the plurality of stators 122 of the electric motor 120. The driving signal creating unit 124 creates a driving signal responsive to the first control signal D1 received from the processing unit 108, and inputs the driving signal to the driving circuit 123. The first control signal D1 sets the magnitude of the driving current to be supplied to the coil of the stator 122. The driving signal creating unit 124 creates the driving signal so that a driving current matching the setting of this first control signal D1 is supplied.

For example, the driving signal creating unit 124 includes a digital-analog (D/A) converter that outputs an analog driving signal having an amplitude matching the signal value (digital value) of the first control signal D1. Alternatively, the driving signal creating unit 124 may include a smoothing circuit that smoothes a pulse width modulate (PWM) signal that has been subjected to pulse width modulation according to the signal value (digital value) of the first control signal D1, and outputs the PWM signal as the driving signal.

The driving machine 106 is not restricted to the electric motor 120 described above, but may include any of other various types of motors that use other power sources to generate torque.

Under control by the processing unit 108, the braking machine 107 applies a brake to the rotation of the manipulation member 102 by using a friction force. Specifically, in response to a second control signal D2 input from the processing unit 108, the braking machine 107 generates braking torque Tb that applies a brake to the rotation of the manipulation member 102 by using a friction force. For example, the braking machine 107 preferably includes a magneto-rheological fluid 134 in contact with the manipulation member 102 and a magnetic field control unit 132 that controls a magnetic field exerted on the magneto-rheological fluid 134.

The magnetic field control unit 132 generates a magnetic field responsive to the second control signal D2, and changes the viscosity of the magneto-rheological fluid 134 by using the magnetic field. The magnetic field control unit 132 is, for example, a coil wound around the shaft 112 in a ring shape. As illustrated in FIG. 2, the magnetic field control unit 132 is disposed in a coil case 131, in a ring shape, which is disposed around the shaft 112 of the manipulation member 102. The coil case 131 has an opposing surface 133 substantially perpendicular to the rotational axis AX. A resistive disc 135, in a discoid shape, that has a surface substantially perpendicular to the rotational axis AX is fastened to the shaft 112. The resistive disc 135 and coil case 131 are disposed so that one surface of the resistive disc 135 and the opposing surface 133 of the coil case 131 come close to each other. The magneto-rheological fluid 134 is supplied into a clearance between the resistive disc 135 and the opposing surface 133 of the coil case 131, and is sealed in this clearance with a sealing member (not illustrated).

When a driving current flowing in the magnetic field control unit 132 changes, the magnetic field passing through the magneto-rheological fluid 134 changes. Then, a force with which particles constituting the magneto-rheological fluid 134 are bonded changes due to the change in the magnetic field. The viscosity of the magneto-rheological fluid 134 thereby changes due to the change in the bonding force of the particles. When the viscosity of the magneto-rheological fluid 134 changes, a force that impedes relative rotation between the coil case 131 and the resistive disc 135, that is, a friction force, changes. The larger this friction force is, the larger the braking torque Tb that applies a brake to the rotation of the manipulation member 102 is. The magnitude of the braking torque Tb changes according to the magnitude of the driving current flowing in the magnetic field control unit 132.

The braking machine 107 further includes a driving circuit 136 and a driving signal creating unit 137 as illustrated in FIG. 3. The driving circuit 136 generates a driving current responsive to a received driving signal and supplies the driving current to the magnetic field control unit 132. The driving signal creating unit 137 creates a driving signal responsive to the second control signal D2 received from the processing unit 108, and inputs the driving signal to the driving circuit 136. The second control signal D2 sets the magnitude of the driving signal to be supplied to the magnetic field control unit 132. The driving signal creating unit 137 creates the driving signal so that a driving current matching the setting of this second control signal D2 is supplied.

For example, the driving signal creating unit 137 includes a D/A converter that outputs an analog driving signal having an amplitude matching the signal value (digital value) of the second control signal D2. Alternatively, the driving signal creating unit 137 may include a smoothing circuit that smoothes a PWM signal that has been subjected to pulse width modulation according to the signal value (digital value) of the second control signal D2, and outputs the PWM signal as the driving signal.

The braking machine 107 is not restricted to using the viscosity of the magneto-rheological fluid 134 as described above. Braking torque Tb based on a friction force may be generated in any of other various methods. For example, the braking machine 107 may generate braking torque Tb by a method in which a member is mechanically brought into contact with the manipulation member 102 or a method in which an electromagnetic force is used.

Rotational Angle Sensor 105

The rotational angle sensor 105 detects the rotational angle of the manipulation member 102. The rotational angle sensor 105 includes, for example, a rotary encoder 140. The rotary encoder 140 includes a detecting disc 141, in a discoid shape, that is fastened to the shaft 112 of the manipulation member 102, and also includes an optical detecting unit 142 disposed so as to come close to the vicinity of the outer circumferential edge of the detecting disc 141, as indicated in, for example, FIG. 2. A plurality of holes are formed in the vicinity of the outer circumferential edge of the detecting disc 141. The optical detecting unit 142 optically detects the presence or absence of these holes. The rotational angle of the manipulation member 102 is detected from a detection result from the optical detecting unit 142.

The rotational angle sensor 105 may detect the rotational angle by any of other various methods without being restricted to the rotary encoder 140 described above. For example, the rotational angle sensor 105 may detect the rotational angle according to a change in a magnetic field due to the permanent magnets fastened to the shaft 112 or may detect the rotational angle by a sensor in which its resistance value or another physical quantity changes according to the rotation of the shaft 112.

Processing Unit 108

The processing unit or processor 108 is a device that executes processing such as control involved in the operation of the rotation-type manipulation device 100 and input and output of data. For example, the processing unit 108 includes a computer that executes various types of processing according to a program 155 stored in the storage unit 109. The processing unit 108 may execute all processing by the computer or may execute at least part of processing by specific hardware (logic circuit).

The processing unit 108 includes a control unit 151 as a constituent element that performs processing involved in the control of the driving machine 106 and braking machine 107.

The control unit 151 controls control torque T1, which is the sum of driving torque Td of the driving machine 106 and braking torque Tb of the braking machine 107, according to the rotational angle detected in the rotational angle sensor 105. That is, when the rotational angle of the manipulation member 102, the rotational angle changing in one direction, is present in a first segment R1, the control unit 151 preferably changes the direction of control torque T1 from a direction to encourage the rotation of the manipulation member 102 (sometimes referred to below as the encouragement direction) to a direction to suppress the rotation (sometimes referred to below as the suppression direction) as the rotational angle changes. When the rotational angle changing in one direction is present in a second segment R2, the control unit 151 changes the direction of control torque T1 from the suppression direction to the encouragement direction as the rotational angle changes.

The first segment R1 and second segment R2 are each preferably a segment set in a rotational angle range within which the manipulation member 102 can be rotated. First segments R1 and second segments R2 are alternately arranged. At least part of the rotational angle range is segmented into first segments R1 and second segments R2, which are alternately arranged. That is, a plurality of first segments R1 are preferably set in the range within which rotational angle can be changed, and one second segment R2 intervenes between two consecutive first segments R1.

When, in the first segment R1, the rotational angle passes through a predetermined transition area in which control torque T1 changes from the encouragement direction to the suppression direction, the control unit 151 increases braking torque Tb of the braking machine 107 in a pulse state.

Furthermore, the control unit 151 preferably makes the peak of control torque T1 in the suppression direction between two consecutive transition areas smaller than the peak of control torque T1 in the suppression direction in the transition area.

The control unit 151 performs this control of control torque T1 according to, for example, pattern data 156 stored in the storage unit 109. Specifically, the control unit 151 creates the first control signal D1 and second control signal D2 that have a signal value corresponding to the detection value of the rotational angle, according to a preset correspondence between the rotational angle of the manipulation member 102 and the signal value of the first control signal D1 and to a preset correspondence between the rotational angle of the manipulation member 102 and the signal value of the second control signal D2. The pattern data 156 defines the correspondence between the rotational angle of the manipulation member 102 and the signal value of the first control signal D1 and the correspondence between the rotational angle of the manipulation member 102 and the signal value of the second control signal D2. The control unit 151 references the pattern data 156 and creates the first control signal D1 and second control signal D2 matching the detection value of the rotational angle.

Figure 4:
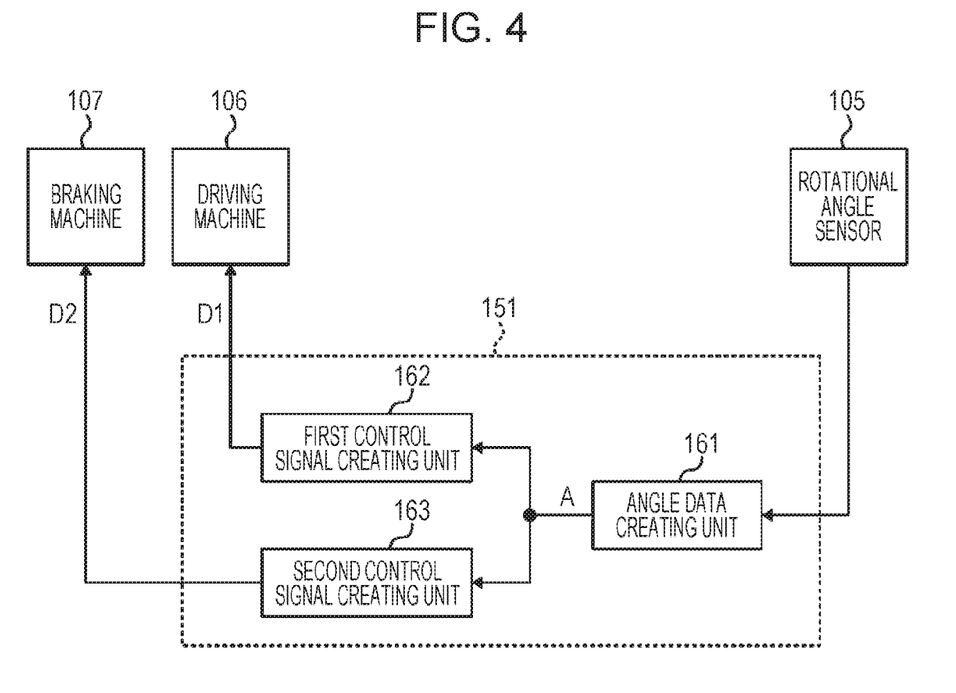
FIG. 4 is a block diagram illustrating an example of a structure of a control unit.

FIG. 4 is a block diagram illustrating an example of a structure of a control unit. In the example in FIG. 4, the control unit 151 includes an angle data creating unit 161, a first control signal creating unit 162, and a second control signal creating unit 163.

The angle data creating unit 161 creates angle data A matching the detection value of a rotational angle detected in the rotational angle sensor 105. For example, the angle data creating unit 161 converts the detection value of a rotational angle in a range within which the manipulation member 102 can be rotated to angle data A that represents a relative rotational angle in each of a plurality of angle ranges included in this range. As a specific example, it will be assumed that there is no limitation on the range within which the manipulation member 102 can be rotated, the range of one rotation (360°) is divided into 12 angle ranges, each of which has a width of 30°. In this case, the angle data creating unit 161 changes angle data A from 0° to 30° 12 times during a period in which the detection value of the rotational angle changes from 0° to 360°.

The first control signal creating unit 162 creates the first control signal D1 having a signal value corresponding to angle data A, according to a correspondence, included in the pattern data 156, between angle data A and the signal value of the first control signal D1.

The second control signal creating unit 163 creates the second control signal D2 having a signal value corresponding to angle data A, according to a correspondence, included in the pattern data 156, between angle data A and the signal value of the second control signal D2.

Figure 5:
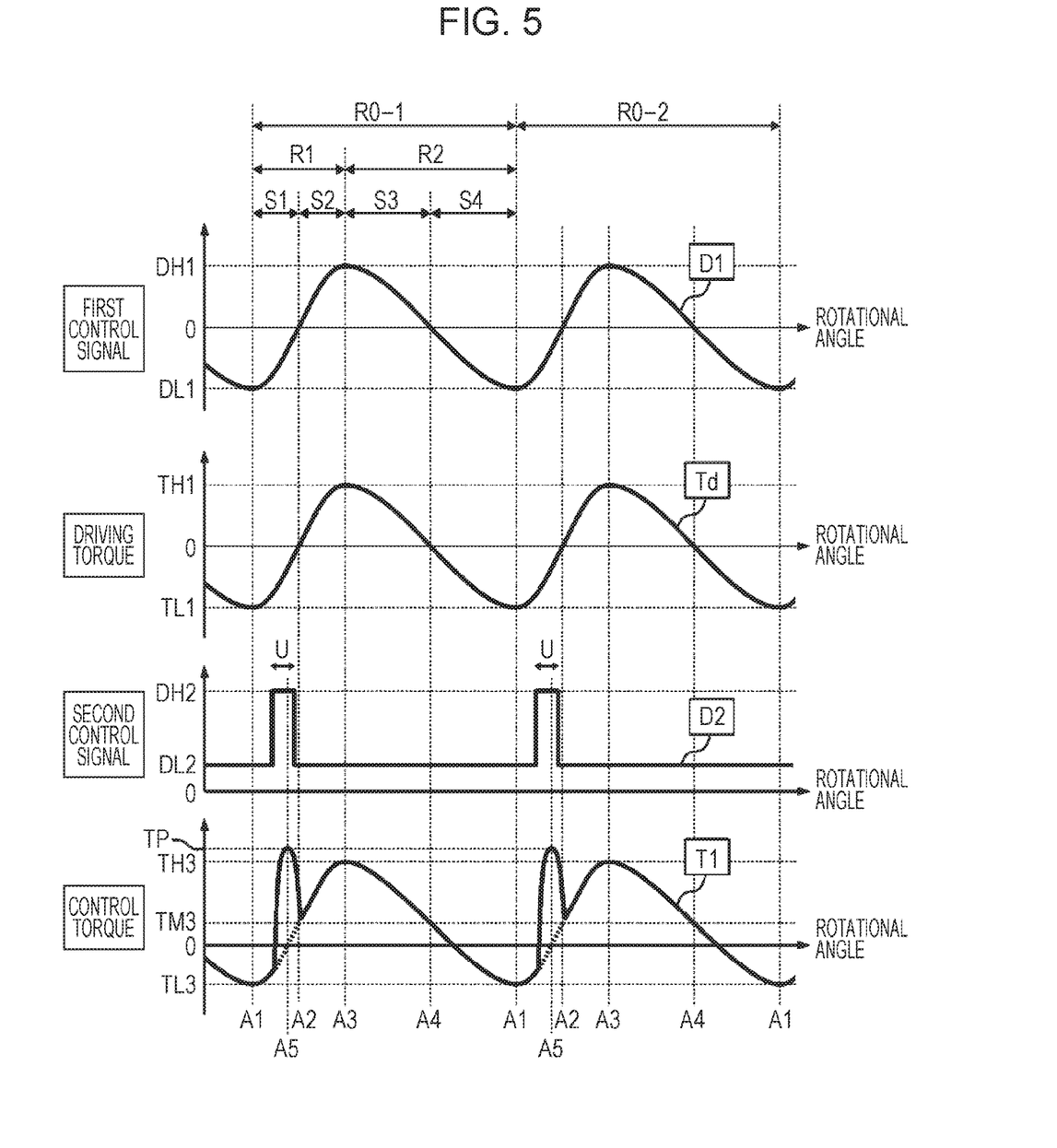
FIG. 5 illustrates an example of a first control signal and a second control signal that change according to a rotational angle as well as driving torque and control torque that correspond to these control signals.

FIG. 5 illustrates an example of the first control signal D1 and second control signal D2 that change according to a rotational angle as well as driving torque Td and control torque T1 that correspond to these control signals. The horizontal axis in FIG. 5 illustrates the change of the rotational angle in one direction with the rotation direction of the manipulation member 102 taken as being positive. In FIG. 5, the positive first control signal D1 indicates that driving torque Td is generated in the suppression direction, and the negative first control signal D1 indicates that driving torque Td is generated in the encouragement direction. Also in FIG. 5, the positive driving torque Td indicates torque in the suppression direction, and the negative driving torque Td indicates torque in the encouragement direction. The second control signal D2 in FIG. 5 specifies the magnitude of braking torque Tb. Control torque T1 in FIG. 5 indicates the sum of driving torque Td and braking torque Tb; the positive and negative signs have the same meaning as driving torque Td.

When the rotation direction of the manipulation member 102 is reversed between a right turn and a left turn, the control unit 151, for example, may create the first control signal D1 and second control signal D2 as in FIG. 5 in each rotation direction. In this case, in each rotation direction, the positive first control signal D1 in FIG. 5 indicates that driving torque Td is generated in the suppression direction, and the negative first control signal D1 indicates that driving torque Td is generated in the encouragement direction.

As illustrated in FIG. 5, the first control signal D1 and second control signal D2 change with the change of the rotational angle in the same pattern in two consecutive angle ranges R0-1 and R0-2. In the range of one rotation (360°), a plurality of angle ranges similar to the angle ranges R0-1 and R0-2 are included. The plurality of angle ranges will be referred to as R0 without being distinguished. In each angle range R0, the angle data creating unit 161 creates angle data A that changes from the start point toward the end point. Thus, the first control signal creating unit 162 and second control signal creating unit 163 respectively create the first control signal D1 and second control signal D2 that similarly change in each angle range R0.

In the example in FIG. 5, a first segment R1 and a second segment R2 are included in one angle range R0. In the first segment R1 from angle data A1 to angle data A3, the first control signal D1 continuously changes from a negative peak value DL1 to a positive peak value DH1, and driving torque Td continuously changes from a negative peak value TL1 to a positive peak value TH1. At angle data A2 in the first segment R1, the first control signal D1 becomes zero and driving torque Td also becomes zero in correspondence to this.

In the second segment R2 from angle data A3 to angle data A1, the first control signal D1 continuously changes from the positive peak value DH1 to the negative peak value DL1, and driving torque Td continuously changes from the positive peak value TH1 to the negative peak value TL1. At angle data A4 in the second segment R2, the first control signal D1 becomes zero and driving torque Td also becomes zero in correspondence to this.

In a first sub-segment S1 in which angle data is from A1 to A2 and a fourth sub-segment S4 in which angle data is from A4 to A1, driving torque Td is negative, so driving torque Td is exerted in the encouragement direction. In a second sub-segment S2 in which angle data is from A2 to A3 and a third sub-segment S3 in which angle data is from A3 to A4, driving torque Td is positive, so driving torque Td is exerted in the suppression direction.

In the example in FIG. 5, the second control signal D2 is set to a value DH2 in a transition area U in the first segment R1 and to a value DL2, which is smaller than the value DH2, in other than the transition area U. That is, the second control signal D2 is increased in a pulse state in the transition area U. Therefore, braking torque Tb of the braking machine 107 is also increased in a pulse state in the transition area U.

Since control torque T1 is the sum of driving torque Td and braking torque Tb, the graph of control torque T1 illustrated in FIG. 5 is obtained by shifting the graph of driving torque Td illustrated in FIG. 5 in the positive direction by an amount equal to the value TM3 of the steady braking torque Tb. The value TM3 of the steady braking torque Tb is a torque value corresponding to the valued DL2 of the second control signal D2.

Each portion indicated by a dotted line in the graph of control torque T1 illustrated in FIG. 5 indicates control torque T1 in a case in which the second control signal D2 is kept at the value DH2 (in a case in which there is no increase in a pulse state in the transition area U). In this dotted graph, angle data A5 at which control torque T1 becomes zero is a rotational angle at which control torque T1 changes from the encouragement direction to the suppression direction. At this rotational angle (sometimes referred to below as the stable point), it becomes easy to stably stop the rotation of the manipulation member 102. The transition area U is set in an area in which control torque T1 changes from the encouragement direction to the suppression direction, that is, an area that includes the stable point (rotational angle A5).

In other than the transition area U, the peak value of control torque T1 is TH3 in the suppression direction and TL3 in the encouragement direction. In the transition area U, the peak value of control torque T1 in the suppression direction is TP. The peak value TP in the suppression direction in the transition area U is larger than the peak value TH3 in the suppression direction in other than the transition area U.

Storage Unit

The storage unit 109 stores constant data and variable data that are used in processing in the processing unit 108, data obtained as a result of processing, and the like. If the processing unit 108 includes a computer, the storage unit 109 may store the program 155 executed by the computer. The storage unit 109 includes, for example, a volatile memory such as a dynamic random access memory (DRAM) or static random access memory (SRAM), a non-volatile memory such as a flash memory, a hard disk, or the like.

Interface Unit 110

The interface unit 110 is a circuit used to transmit and receive data between the rotation-type manipulation device 100 and another device (such as a host computer that accepts manipulation information from the rotation-type manipulation device 100 and uses the manipulation information in processing). The processing unit 108 outputs information (such as manipulation information involved in rotation manipulation for the manipulation member 102) stored in the storage unit 109 from the interface unit 110 to a device (not illustrated).

The interface unit 110 may acquire the program 155 executed by the computer in the processing unit 108 from a server or the like on a network and may load the program 155 into the storage unit 109. In another example, the interface unit 110 may include a read device that reads the program 155 from a non-temporary tangible medium (such as an optical disk or universal serial bus (USB) memory) and stores the program 155 in the storage unit 109.

Figure 6:
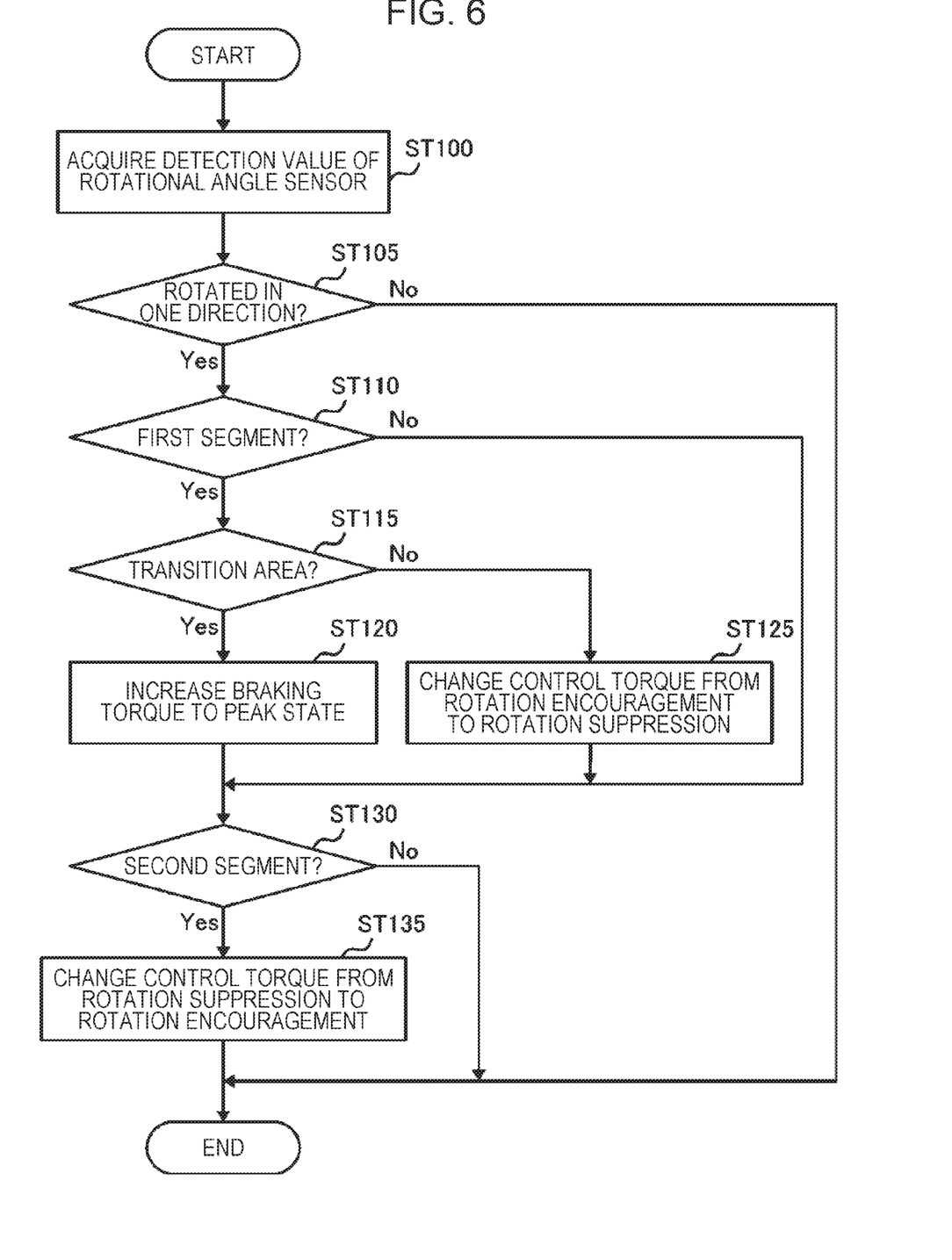
FIG. 6 is a flowchart used to explain processing involved in creation of the control signals.

Here, processing involved in the creation of control signals (D1 and D2), the processing being executed by the rotation-type manipulation device 100 having the structure described above, will be described with reference to the flowchart illustrated in FIG. 6. Processing in the flowchart in FIG. 6 is executed, for example, each time a detection result of the rotational angle sensor 105 is acquired at a predetermined interval.

The control unit 151 acquires the detection value of the rotational angle, detected in the rotational angle sensor 105, of the manipulation member 102 (ST100), compares the detection value, acquired this time, of the rotational angle with the previous detection value of the rotational angle, and decides whether the manipulation member 102 is rotating in one direction (ST105). If the manipulation member 102 is not rotating in one direction (the rotation direction has been reversed), the control unit 151 terminates the processing without executing the subsequent steps (No in ST105).

If the manipulation member 102 is rotating in one direction (Yes in ST105), the control unit 151 controls control torque T1 according to the segment in which the rotational angle is included. If the rotational angle is present in the first segment R1 (Yes in ST110) and the rotational angle is present in the transition area U (Yes in ST115), the control unit 151 creates the second control signal D2 that increases braking torque Tb in a peak state (ST120). Specifically, in the example in FIG. 5, the control unit 151 sets the value of the second control signal D2 to DH2.

If the rotational angle is present in the first segment R1 (Yes in ST110) and the rotational angle is present in other than the transition area U (No in ST115), the control unit 151 changes the direction of the control torque T1 from the encouragement direction to the suppression direction (ST125). Specifically, in the example in FIG. 5, the control unit 151 increases control torque T1 in the positive direction.

If the rotational angle is present in the second segment R2 (Yes in ST130), the control unit 151 changes the direction of control torque T1 from the suppression direction to the encouragement direction (ST135). Specifically, in the example in FIG. 5, the control unit 151 increases control torque T1 in the negative direction.

As described above, with the rotation-type manipulation device 100 according to this embodiment, when control torque T1 in the suppression direction is increased in the first segment R1 as the rotational angle changes, a sense that a resistive force is increased as the manipulation member 102 rotates is obtained. After that, when the rotational angle shifts from the first segment R1 to the second segment R2 and control torque T1 in the suppression direction is reduced as the rotational angle changes, a sense that a resistive force is lowered as the manipulation member 102 rotates is obtained. When control torque T1 in the encouragement direction is increased at an intermediate point in the second segment R2 as the rotational angle changes, a sense that the drawing force is increased as the manipulation member 102 rotates is obtained. Then, when the rotational angle shifts from the second segment R2 to the first segment R1 and control torque T1 in the encouragement direction is reduced as the rotational angle changes, a sense that the drawing force is weakened as the manipulation member 102 rotates is obtained. Since this change in control torque T1 occurs, it becomes easy to stably stop the rotation of the manipulation member 102 in the area, in the first segment R1, in which control torque T1 changes from the encouragement direction to the suppression direction. Also, a click feeling accompanying a rotation manipulation is produced due to a change of control torque T1 in the first segment R1 and second segment R2. However, a click feeling obtained from a change in control torque T1 in the first segment R1 and second segment R2 is poor in clearness because the click feeling is mainly due to a change in driving torque Td like a ripple and is not a click feeling obtained from a steep change in torque.

However, with the rotation-type manipulation device 100 according to this embodiment, when the rotational angle passes through the transition area U, in which control torque T1 changes from the encouragement direction to the suppression direction, braking torque Tb based on a friction force is increased in a pulse state. Even if braking torque Tb is steeply increased, braking torque Tb based on a friction force does not cause vibration unlike the driving torque of an electric motor. Therefore, when the rotational angle passes through the transition area U, a clearer click feeling can be produced without a change like vibration being caused in control torque T1.

In general, a person's sense of a load has the characteristic that the more a person feels a large load, the less he or she feels a change in a small load. The faster the manipulation member 102 is rotated, the larger its kinetic energy becomes, so the load of the rotation manipulation is felt heavy. Since a click feeling is a change in a small load, therefore, it becomes difficult to have such a click feeling. In addition, the person's sense has frequency characteristics; a person has characteristics that the higher a frequency is, the less he or she feels a change in pressure. Therefore, the faster the manipulation member 102 is rotated, the more ripple-like changes of driving torque Td are sensuously averaged, so it becomes further difficult to feel these changes as a click feeling. According to the rotation-type manipulation device 100 in this embodiment, when the manipulation member 102 is rotated fast to increase braking torque Tb based on a friction force in a pulse state in the transition area U, this braking torque Tb in a pulse state is likely to be felt as vibration. A person's sense of vibration is likely to be maintained event at high frequencies. Therefore, even when the manipulation member 102 is rotated fast, braking torque Tb based on a friction force in a pulse state can be clearly felt as a click feeling. That is, with the rotation-type manipulation device 100 according to this embodiment, a clear click can be produced even through a high-speed rotation manipulation.

In addition, with the rotation-type manipulation device 100 according to this embodiment, braking torque Tb is increased in the transition area U, in which it becomes easy to stably stop the rotation of the manipulation member 102, so the stopping of the rotation in the transition area U is assisted by this large braking torque Tb. Usually, when a person stops a rotation operation, he or she needs to exert an extra force against the inertia torque of the manipulation member. When an extra force is exerted, it causes a sense of fatigue and the quality of a manipulation feeling is thereby lowered. According to this embodiment in which the stopping of rotation is assisted by braking torque Tb, an extra force to stop rotation is reduced and a sense of fatigue is less likely to be felt than when this assistance is not available. Therefore, it is possible to enhance the quality of a manipulation feeling.

In a conventional method generally known as a method of mechanically producing a click feeling, an abutting member such as a metal sphere urged by an elastic body is pressed against a cam surface having concave and convex portions. A concave portion functions as a stable point of the abutting member. When the abutting member moves while riding over a convex portion from one concave portion to another, a click feeling is produced. In this click mechanism, a friction force is minimized at the concave portion, which is a stable point, and is maximized at the convex portion, which is an unstable point. Therefore, when the abutting member is stopped at a stable point, assistance by the friction force is small and fatigue is thereby likely to be felt. This is disadvantageous in that the quality of a manipulation feeling is not easily enhanced. Another disadvantage is that since the friction force is large at the unstable point, it is difficult to obtain a light manipulation feeling. In contrast, with the rotation-type manipulation device 100 according to this embodiment, control torque T1 in the suppression direction between two consecutive transition areas U can be made relatively smaller than control torque in the suppression direction in the transition area U. Therefore, it is possible to make a manipulation feeling lighter than when a click feeling is mechanically produced and to obtain a superior manipulation feeling that makes a sense of fatigue less likely to be felt.

Furthermore, according to the rotation-type manipulation device 100 in this embodiment, driving torque Td responsive to the first control signal D1 is generated in the driving machine 106, and braking torque Tb responsive to the second control signal D2 is generated in the braking machine 107. Due to different combinations of driving torque Td and braking torque Tb, therefore, it is possible to create control torque T1 that produces various manipulation feelings.

Also, according to the rotation-type manipulation device 100 in this embodiment, when the viscosity of the magneto-rheological fluid 134 is changed by using a magnetic field generated by the magnetic field control unit 132, braking torque Tb to be applied to the manipulation member 102 is changed. Therefore, precise control of braking torque Tb becomes possible unlike a method in which a mechanical friction force is applied to the manipulation member 102.

The present invention is not limited to the embodiment described above. The present invention includes various variations.

Figure 7:
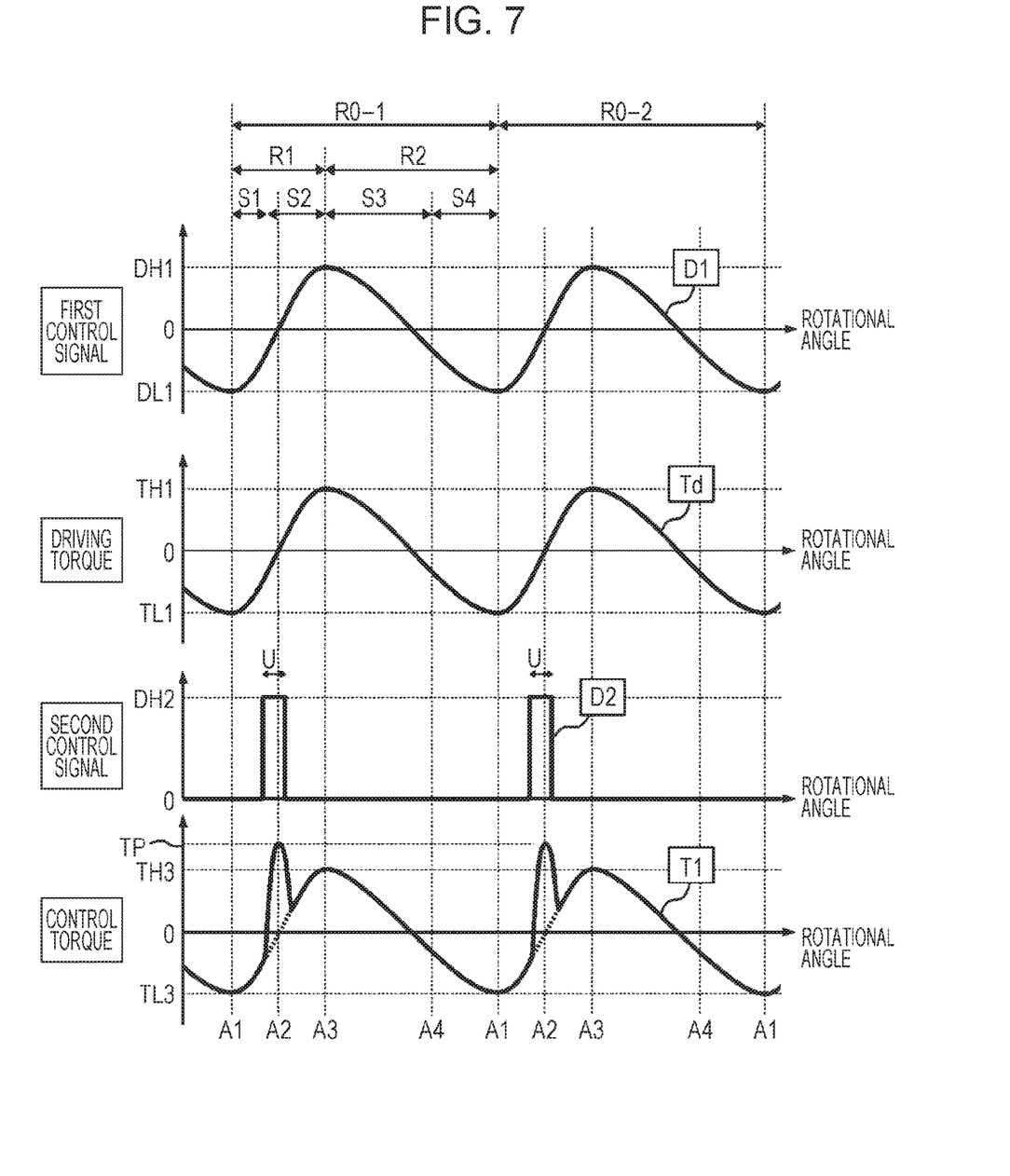
FIG. 7 illustrates a variation of the first control signal and second control signal that change according to a rotational angle as well as driving torque and control torque that correspond to these control signals.

For example, in the example in FIG. 5 in the embodiment described above, the value of the second control signal D2 has been set to DL2 in rotational angles in other than the transition area U to generate constant braking torque Tb (=TM3). However, the present invention is not limited to this example. In another example in the present invention, steady braking torque Tb in rotational angles in other than the transition area U may be set to zero (or a minimum value) as illustrated in, for example, FIG. 7. Thus, it is possible to produce a clear click in the transition area U and produce a light manipulation feeling as a whole.

The value of the second control signal D2 in rotational angles in other than the transition area U does not need to be constant as in the example in FIG. 5, and may be changed according to the rotational angle. Thus, it becomes possible to obtain a desired manipulation feeling such as a light feeling or a heavy feeling.

In the embodiment described above, the setting of braking torque Tb in the transition area U has been constant. However, the present invention is not limited to this example. In another example in the present invention, a rotational speed (angular speed) may be calculated according to the rotational angle detected in the rotational angle sensor 105, and the rotational speed may be changed according to braking torque Tb in the transition area U. For example, braking torque Tb in the transition area U may be made larger as the rotation speed becomes faster.

Figure 8:
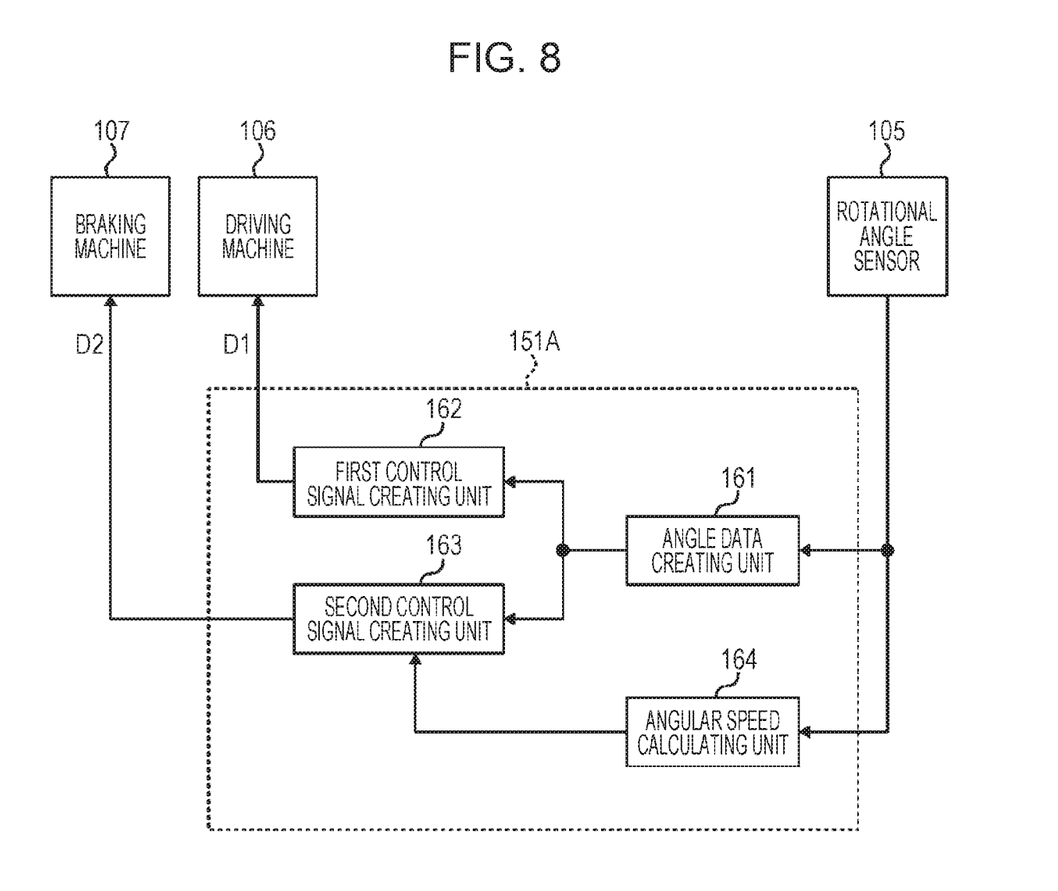
FIG. 8 is a block diagram illustrating an example of the structure of a control unit in a variation of the present invention.

FIG. 8 is a block diagram indicating an example of the structure of a control unit 151A in a variation of the present invention. The control unit 151A illustrated in FIG. 8 has an angular speed calculating unit 164 besides a structure similar to the structure of the control unit 151 illustrated in FIG. 4. The angular speed calculating unit 164 calculates the angular speed of the rotation of the manipulation member 102 according to the rotational angle detected in the rotational angle sensor 105. The second control signal creating unit 163 changes braking torque Tb in the transition area U according to the angular speed calculated in the angular speed calculating unit 164. For example, the second control signal creating unit 163 preferably increases braking torque Tb in the transition area U as the angular speed becomes faster.

When braking torque Tb in the transition area U is changed according to the rotational speed of the manipulation member 102 as described above, it becomes possible to suppress a change in the strength of a click feeling due to a change in perception matching the rotational speed and to produce a stable click feeling.

Although the above embodiment has described the shape and structure of the manipulation member 102, the means for generating control torque Td in the driving machine 106, the means for generating control torque Tb in the braking machine 107, and the means for detecting a rotational angle in the rotational angle sensor 105, and the like, these are just examples. Each of them can be replaced with another shape, structure, mechanism, means, or the like that matches the relevant embodiment.

What is claimed is:

1. A rotation-type manipulation device comprising:
    a manipulation member that is rotatable according to a rotation manipulation;
    a rotational angle sensor that detects a rotational angle of the manipulation member;
    a driving machine that drives rotation of the manipulation member;
    a braking machine that applies a brake to the rotation of the manipulation member by using a friction force; and
    a controller that controls control torque, which is a sum of driving torque of the driving machine and braking torque of the braking machine, according to the rotational angle detected in the rotational angle sensor; wherein
    the controller:
        changes a direction of the control torque from an encouragement direction to encourage the rotation of the manipulation member to a suppression direction to suppress the rotation as the rotational angle changes in one direction, and
        increases, when the rotational angle passes through a transition area in which the control torque changes from the encouragement direction to the suppression direction, the braking torque in a pulse state.

2. The rotation-type manipulation device according to claim 1, wherein:
    in a range in which the rotational angle is changeable, a plurality of segments, each of which includes the transition area, is set; and
    in each of the plurality of segments, the controller changes the direction of the control torque from the encouragement direction to the suppression direction as the rotational angle changes in the one direction.

3. The rotation-type manipulation device according to claim 2, wherein the controller makes a peak of the control torque in the suppression direction between two consecutive transition areas smaller than a peak of the control torque in the suppression direction in the transition area.

4. The rotation-type manipulation device according to claim 2, wherein the controller sets the braking torque between two consecutive transition areas to a minimum value.

5. The rotation-type manipulation device according to claim 2, wherein between two consecutive transition areas, the controller holds the braking torque at a constant value or changes the braking torque according to the rotational angle.

6. The rotation-type manipulation device according to a claim 1, wherein the controller calculates a rotational speed according to the rotational angle detected in the rotational angle sensor and changes the braking torque in the transition area according to the calculated rotational speed.

7. The rotation-type manipulation device according to claim 6, wherein the controller makes the braking torque in the transition area larger as the rotation speed becomes faster.

8. The rotation-type manipulation device according to claim 1, wherein the braking machine includes: a magneto-rheological fluid in contact with the manipulation member; and a magnetic field controller that generates a magnetic field responsive to a command from the control unit and changes viscosity of the magneto-rheological fluid by using the magnetic field.

9. A control method for a rotation-type manipulation device that controls control torque to be applied to a manipulation member that is rotatable according to a rotation manipulation, wherein:
    the rotation-type manipulation device has:
        a rotational angle sensor that detects a rotational angle of the manipulation member,
        a driving machine that drives rotation of the manipulation member, and
        a braking machine that applies a brake to the rotation of the manipulation member, and
    the control torque is a sum of driving torque of the driving machine and braking torque of the braking machine,
    the control method comprising:
        changing the control torque from an encouragement direction to encourage the rotation of the manipulation member to a suppression direction to suppress the rotation as the rotational angle changes in one direction; and
        increasing, when the rotational angle passes through a transition area in which the control torque changes from the encouragement direction to the suppression direction, the braking torque in a pulse state.

10. A nonvolatile memory having stored therein a program that causes a computer to execute a control method for a rotation-type manipulation device wherein:
    the rotation-type manipulation device has:
        a rotational angle sensor that detects a rotational angle of the manipulation member,
        a driving machine that drives rotation of the manipulation member, and
        a braking machine that applies a brake to the rotation of the manipulation member, and
    the control torque is a sum of driving torque of the driving machine and braking torque of the braking machine,
    wherein when the program is executed by the computer, the computer causes the rotation-type manipulation device to:
        change the control torque from an encouragement direction to encourage the rotation of the manipulation member to a suppression direction to suppress the rotation as the rotational angle changes in one direction; and increase, when the rotational angle passes through a transition area in which the control torque changes from the encouragement direction to the suppression direction, the braking torque in a pulse state.

* * * * *